(12) United States Patent
Long et al.

(10) Patent No.: US 10,920,466 B2
(45) Date of Patent: Feb. 16, 2021

(54) AIRCRAFT LAVATORY DOOR LATCH

(71) Applicant: C & D Zodiac, Inc., Huntington Beach, CA (US)

(72) Inventors: Eric Long, Huntington Beach, CA (US); Glen Noda, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 465 days.

(21) Appl. No.: 15/878,215

(22) Filed: Jan. 23, 2018

(65) Prior Publication Data
US 2018/0209185 A1 Jul. 26, 2018

Related U.S. Application Data

(60) Provisional application No. 62/449,538, filed on Jan. 23, 2017.

(51) Int. Cl.
| | |
|---|---|
| *E05B 65/00* | (2006.01) |
| *E05B 41/00* | (2006.01) |
| *E05C 1/12* | (2006.01) |
| *E05B 15/04* | (2006.01) |
| *B64D 11/02* | (2006.01) |

(Continued)

(52) U.S. Cl.
CPC .............. *E05C 1/12* (2013.01); *B64C 1/1407* (2013.01); *B64D 11/02* (2013.01); *E05B 15/04* (2013.01); *E05B 41/00* (2013.01); *E05B 53/00* (2013.01); *E05B 65/0035* (2013.01); *E05B 65/0085* (2013.01); *E05B 83/00* (2013.01);
(Continued)

(58) Field of Classification Search
CPC ......... Y10T 292/0966; Y10T 292/0993; Y10T 292/1018; Y10T 292/307; Y10T 292/308; E05B 41/00
See application file for complete search history.

(56) References Cited

U.S. PATENT DOCUMENTS

| | | | | |
|---|---|---|---|---|
| 419,607 A | * | 1/1890 | King ....................... | E05B 41/00 |
| | | | | 40/460 |
| 747,252 A | | 12/1903 | Smith | |

(Continued)

FOREIGN PATENT DOCUMENTS

| | | |
|---|---|---|
| CN | 2613559 Y | 4/2004 |
| EP | 3388601 B1 * 9/2019 ......... E05B 63/0056 |

(Continued)

OTHER PUBLICATIONS

PCT/US2018/014897 International Search Report & Written Opinion dated Mar. 9, 2018.
Office Action issued in Chinese Application 201880006257.4

*Primary Examiner* — Carlos Lugo
(74) *Attorney, Agent, or Firm* — Jeffer Mangels Butler & Mitchell LLP; Brennan C. Swain, Esq.

(57) ABSTRACT

A door latch assembly configured to be used in an aircraft lavatory door. The door latch assembly includes a housing that includes a housing interior, a switch member operatively associated with the housing that is rotatable between a first position and a second position, and a locking bolt that is movable linearly between an unlocked position and a locked position. Rotation of the switch member from the first position to the second position moves the locking bolt from the unlocked position to the locked position.

9 Claims, 9 Drawing Sheets

(51) Int. Cl.
*E05B 83/00* (2014.01)
*E05C 1/06* (2006.01)
*B64C 1/14* (2006.01)
*E05B 53/00* (2006.01)

(52) U.S. Cl.
CPC ........ *E05C 1/06* (2013.01); *E05B 2015/0493* (2013.01); *Y10T 292/1018* (2015.04); *Y10T 292/307* (2015.04)

(56) References Cited

U.S. PATENT DOCUMENTS

| | | | |
|---|---|---|---|
| 1,066,664 A * | 7/1913 | Senior | E05B 41/00 40/460 |
| 1,216,899 A | 2/1917 | Weyer | |
| 1,255,909 A * | 2/1918 | Monasch | G09F 11/23 40/495 |
| 2,272,909 A * | 2/1942 | Fantl | E05B 41/00 40/460 |
| 2,565,669 A * | 8/1951 | Smith | E05B 41/00 116/290 |
| 2,771,313 A * | 11/1956 | Blake | E05C 1/06 292/142 |
| 4,163,375 A * | 8/1979 | Fujitaki | E05B 63/0017 292/142 |
| 4,490,999 A | 1/1985 | Castle et al. | |
| 4,854,061 A | 8/1989 | Khoshkish | |
| 5,503,441 A * | 4/1996 | Schwaiger | E05B 81/25 292/142 |
| 5,707,090 A * | 1/1998 | Sedley | E05B 13/005 292/142 |
| 6,023,952 A * | 2/2000 | Mantarakis | E05B 53/00 292/142 |
| 6,938,445 B2 | 9/2005 | Huang | |
| 7,363,784 B2 * | 4/2008 | Shvarts | E05B 63/0056 70/107 |
| 7,523,969 B2 * | 4/2009 | Thornton | E05B 17/042 292/169.14 |
| 8,091,392 B2 * | 1/2012 | Miller | E05B 9/082 70/333 A |
| 8,403,376 B2 * | 3/2013 | Greiner | E05B 47/0012 292/144 |
| 9,428,259 B2 | 8/2016 | Savian et al. | |
| 9,845,620 B2 * | 12/2017 | Bronner | E05B 63/0017 |
| 9,945,158 B2 * | 4/2018 | Lehner, Jr. | E05B 65/1093 |

FOREIGN PATENT DOCUMENTS

| | | | | |
|---|---|---|---|---|
| FR | 674662 A * | 1/1930 | | E05B 41/00 |
| GB | 191424308 A * | 7/1915 | | E05B 41/00 |

* cited by examiner

AIRCRAFT LAVATORY DOOR LATCH

CROSS REFERENCE TO RELATED APPLICATIONS

This application claims the benefit of U.S. Provisional Application No. 62/449,538, filed Jan. 23, 2017, the entirety of which is incorporated herein by reference.

FIELD OF THE INVENTION

The present invention relates generally to an aircraft lavatory door latch.

BACKGROUND OF THE INVENTION

Commercial aircraft, such as the Airbus A320 or Boeing 737, are typically constructed from components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew that include a door on one of the walls thereof. Opening and closing and latching a bi-fold or blade door can often be tricky. Sometimes it is difficult for a passenger to tell whether the door is latched properly or not. The present invention helps make the latching opening of a bi-fold door more intuitive and obvious. This, together with other advantages of the door module, are discussed below.

SUMMARY OF THE PREFERRED EMBODIMENTS

In accordance with a first aspect of the present invention there is provided a door latch assembly configured to be used in an aircraft lavatory door. The door latch assembly includes a housing that includes a housing interior, a switch member operatively associated with the housing that is rotatable between a first position and a second position, and a locking bolt that is movable linearly between an unlocked position and a locked position. Rotation of the switch member from the first position to the second position moves the locking bolt from the unlocked position to the locked position. In a preferred embodiment, the door latch assembly includes at least a first indicator member that is rotatable with the switch member between the first position and the second position. The first indicator member includes a locked portion and an unlocked portion. The housing includes an exterior indicator window. When the switch member is in the locked position the locked portion of the first indicator member is visible through the exterior indicator window, and when the switch member is in the unlocked position the unlocked portion of the first indicator member is visible through the exterior indicator window.

In a preferred embodiment, the housing also includes an interior indicator window and when the switch member is in the locked position the locked portion of the indicator member is visible through the interior indicator window. When the switch member is in the unlocked position the unlocked portion of the indicator member is visible through the interior indicator window. In a preferred embodiment, the door latch assembly also includes a rotating member that is rotatable with the switch member between the first position and the second position. The rotating member includes an unlocked indicator window and a locked indicator window. The unlocked indicator window is at least partially aligned with the interior indicator window and the exterior indicator window when the switch member is in the first position, and the locked indicator window is at least partially aligned with the interior indicator window and the exterior indicator window when the switch member is in the second position.

In a preferred embodiment, the door latch assembly includes a gear train operatively connected to the switch member and the gear train includes at least a first gear (preferably round) meshed with a rack gear. Preferably, the door latch assembly includes an overcenter assist spring having an end that is connected to and rotates with the first gear. The assist spring is configured to compress and then expand as the switch member rotates from the first position to the second position.

In a preferred embodiment, the door latch assembly includes an override assembly that includes a main body portion and a finger lid hingedly connected to the main body portion. The finger lid is pivotable between a stowed position and a deployed position. Rotation of the finger lid from a first position to a second position moves the locking bolt from the unlocked position to the locked position. Preferably, the finger lid is secured in the stowed position by a magnet. In a preferred embodiment, rotation of the finger lid from the first position to the second position rotates the switch member from the first position to the second position. Preferably, rotation of the switch member from the first position to the second position rotates the finger lid from the first position to the second position.

In a preferred embodiment, the door latch assembly includes a connecting rod that extends from the switch member to the rotating member. The connecting rod extends through the second indicator member. Preferably, the locking bolt is movable vertically between the unlocked position and the locked position.

Described herein is a preferred embodiment of a door latch and lock. In a preferred embodiment, the door latch or switch system is used in an aircraft lavatory. However, this is not a limitation on the present invention, and the description herein of the door latch being used in an aircraft is only exemplary. In particular, in a preferred embodiment, the door latch is used with the lavatory door taught in U.S. Pat. No. 9,428,259, issued on Aug. 30, 2016, the entirety of which is incorporated by reference herein. However, this is not a limitation on the present invention. The door latch can be used with a bi-fold or a blade door.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
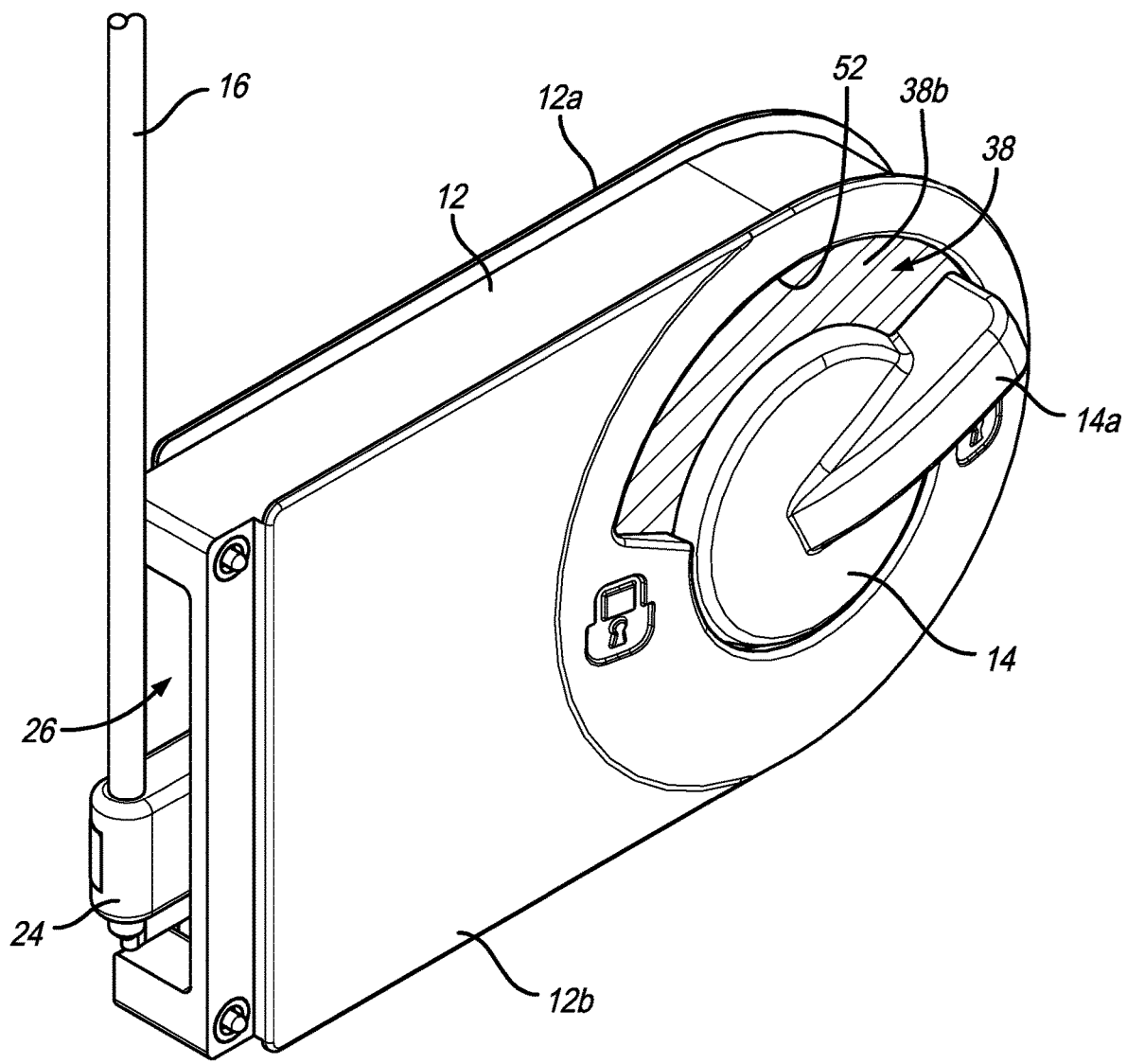
FIG. 1 is a perspective view of a door latch assembly in accordance with a preferred embodiment of the present invention.
Figure 2A:
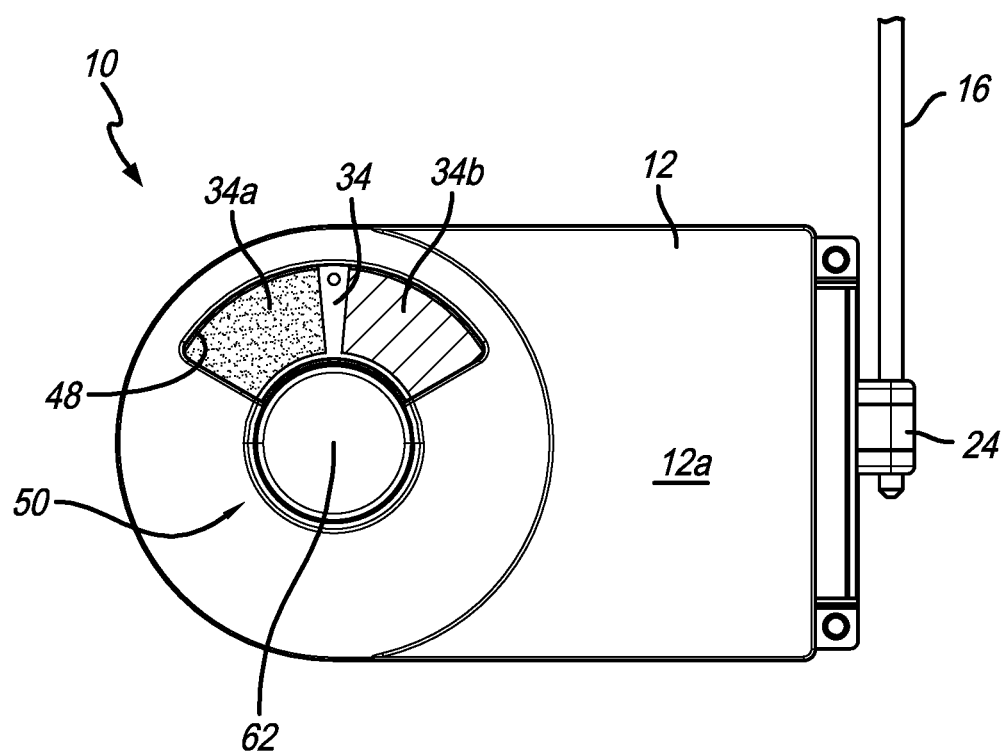
FIG. 2A is a front elevational view of the door latch assembly of FIG. 1 showing the indicator portion between the first and second (locked and unlocked) positions.
Figure 2B:
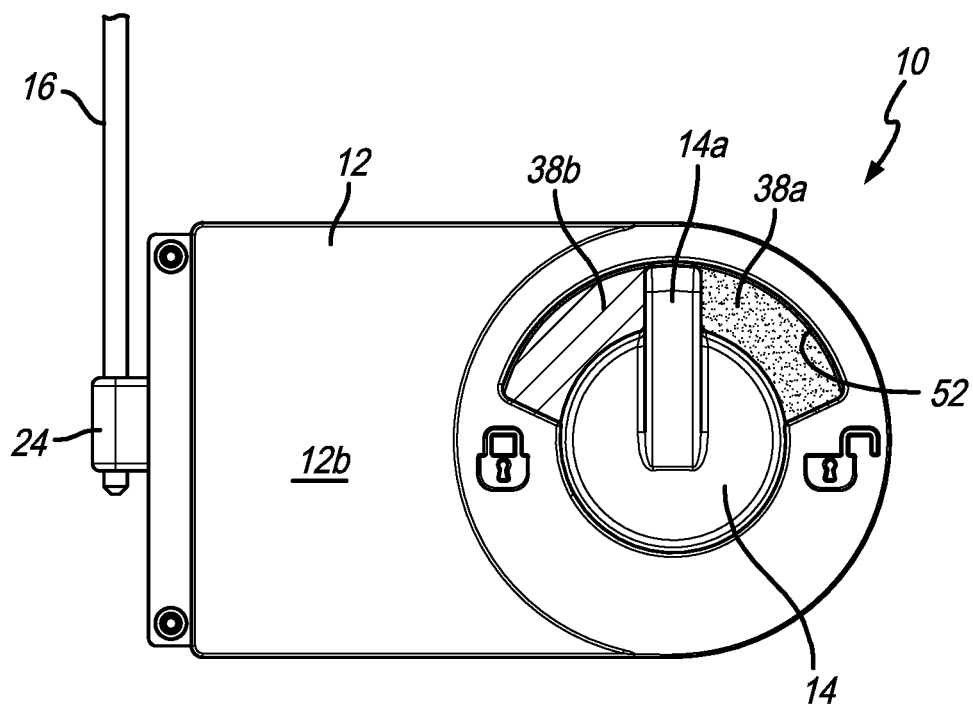
FIG. 2B is a rear elevational view of the door latch assembly of FIG. 1 showing the indicator portion between the first and second (locked and unlocked) positions.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-7 show a door latch assembly 10. In particular, the invention can be used on a lavatory door for commercial passenger aircraft. However, this is not a limitation on the present invention and the door latch assembly can be used elsewhere.

Generally, the door latch assembly includes a housing 12 having a front housing portion 12a and a rear housing portion 12b and a housing interior 12c, a switch member 14 and a locking bolt 16. The switch member 14 is secured to or otherwise associated with the housing 12 and is rotatable between a first or unlocked position and a second or locked position. In a preferred embodiment, the switch member 14 includes a handle portion 14a. The locking bolt 16 is movable linearly between an unlocked position and a locked position. In a preferred embodiment, rotation of the switch member 14 from the first position to the second position moves the locking bolt 16 from the unlocked position to the locked position.

Figure 3:
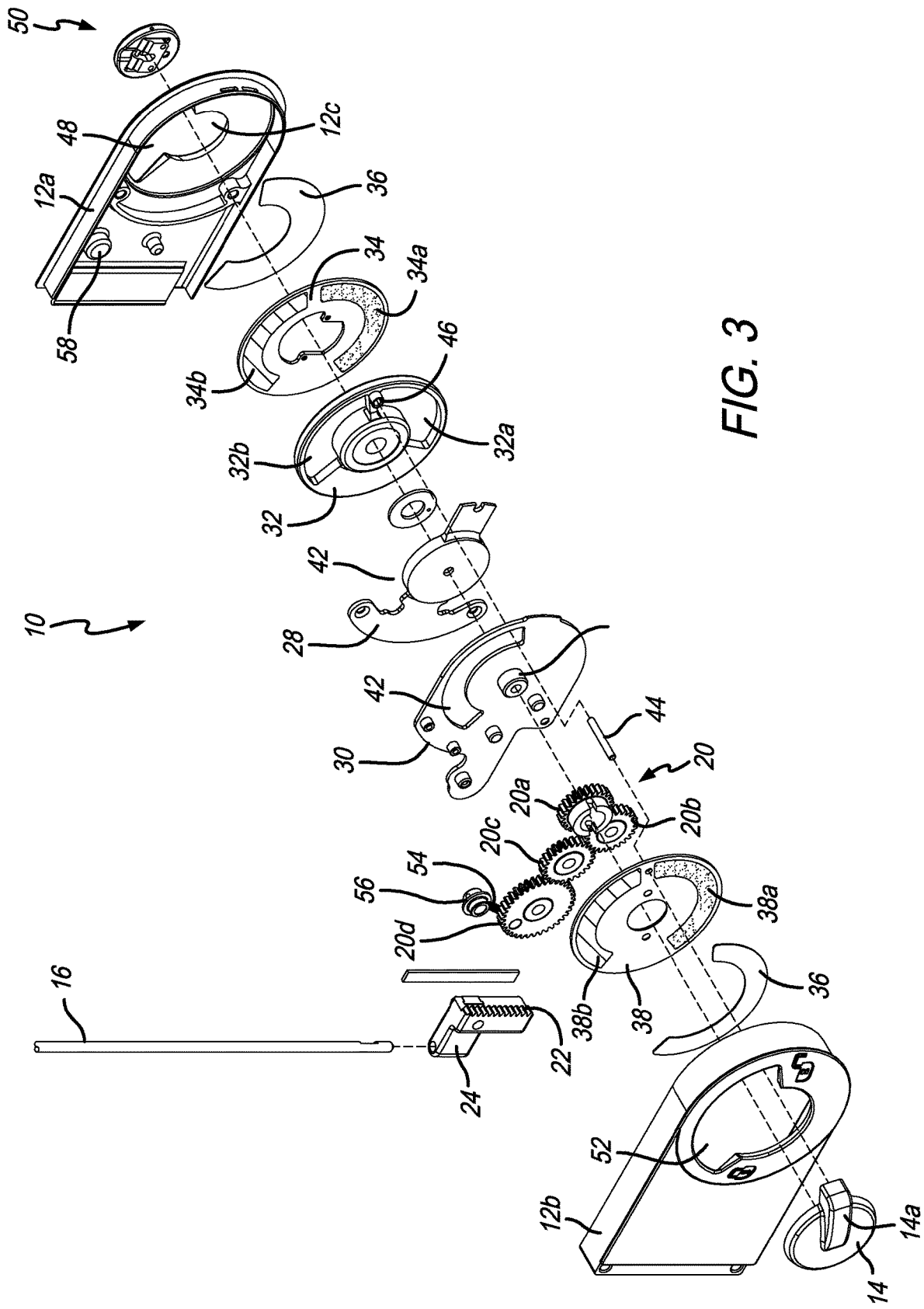
FIG. 3 is an exploded perspective view of the door latch assembly of FIG. 1.

As is best shown in FIG. 3, the switch member 14 is operatively connected to a gear train 18 that includes a series of gears 20 that cooperate with a rack gear 22 that converts the rotational motion of the switch member 14 to linear motion. In the exemplary embodiment shown in the figures the gear train includes first gear 20a, second gear 20b, third gear 20c and fourth gear 20d. The fourth gear 20d meshes with the rack gear 22. In a preferred embodiment, the rack gear 22 is connected to an arm member 24 that extends through a slot 26 that communicates the housing interior 12c with the exterior of the housing 12. The arm member 24 receives or is otherwise connected to the locking bolt 16.

Within housing 12 there are a number of components that rotate with switch member 14 and a number of components that do not, including first and second seat members 28 and 30. The first seat member 28 is situated or positioned closer to the front housing portion 12a and the second seat member 30 is situated or positioned closer to the rear housing portion 12b. As shown in FIG. 3, essentially all of the components between the first seat member 28 and front housing portion 12a are seated on, secured to or otherwise connected to the first seat member 28. Likewise, essentially all of the components between the second seat member 30 and the rear housing portion 12b are seated on, secured to or otherwise connected to the second seat member 30.

In a preferred embodiment, positioned between the first seat member 28 and the front housing portion 12a is a rotating member 32, a first indicator member 34 and a low friction strip 36. In a preferred embodiment, positioned between the second seat member 30 and the rear housing portion 12b is the gear train 18, a second indicator member 38 and a low friction strip 36.

As shown in FIG. 3, the gears 20 of the gear train 18 are seated on and rotate relative to the second seat member 30. For example, the second seat member 30 can include bosses 40 on which the gears are seated. Preferably, the second seat member 30 also includes an indicator slot 42 defined therein. In a preferred embodiment, the first gear 20a (central gear) is operatively connected to the switch member 14 so that it rotates when the switch member 14 is rotated. As shown in FIG. 3, the first gear 20a includes two arcuate flanges that are received in the switch member 14.

In a preferred embodiment, the assembly 10 includes a connecting rod 44 that extends from the switch member 14 through an opening in the second indicator member 38, through the indicator slot 42 in the second seat member 30, through an indicator slot 42 in the first seat member 28 and to the rotating member 32. Generally, the connecting rod 44 causes rotation of the first and second indicator members, the rotating member and the override assembly 50 (described below). The connecting rod 44 can be permanently or temporarily affixed to the switch member 14 and/or the rotating member 32. In a preferred embodiment, the switch member 14 and rotating member 32 both include openings 46 defined therein that receive the opposite ends of the connecting rod 44. The rotating member 32 also preferably includes a locked indicator window 32a and an unlocked indicator window 32b defined therein.

The rotating member 32 is preferably seated on a rotatable with respect to or on the first seat member 28. The first indicator member 34 preferably is connected or secured to the rotating member 32 such that it rotates with the rotating member 32. Preferably, the assembly 10 also includes an override assembly 50 that at least partially extends through a central opening 34c in the first indicator member and connects to the rotating member 32. The override assembly 50 also extends through a central opening 12c defined in the front housing portion 12a.

Preferably, the first indicator member 34 is rotatable with the switch member 14 between the first position and the second position. As shown in FIG. 3, the first indicator member 34 includes a locked portion 34a and an unlocked portion 34b. In a preferred embodiment, the front housing portion 12a includes an exterior indicator window 48 defined therein. In use, when the switch member 14 is in the locked position, the locked portion 34a of the first indicator member 34 is visible through the exterior indicator window 48 and when the switch member 14 is in the unlocked position the unlocked portion 34b of the first indicator member 34 is visible through the exterior indicator window 48.

In a preferred embodiment, the second indicator member 38 is also rotatable with the switch member 14 between the first position and the second position. As shown in FIG. 3, the second indicator member 38 includes a locked portion 38a and an unlocked portion 38b. In a preferred embodiment, the rear housing portion 12b includes an interior indicator window 52 defined therein. In use, when the switch member 14 is in the locked position, the locked portion 38a of the second indicator member 38 is visible through the interior indicator window 52 and when the switch member 14 is in the unlocked position the unlocked portion 38b of the second indicator member 38 is visible through the interior indicator window 52. The locked and unlocked portions can be different colors to indicate to people whether the door is locked or unlocked (e.g., whether the lavatory is in use). Preferably, the locked portions are red and the unlocked portions are green. In the drawings, the unlocked portions are shown in cross-hatching lines and the locked portions are shown in stippling. See, for example, FIG. 2A, which shows the first indicator member 34 with half of the locked portion 34a and half of the unlocked portion 34b showing and FIG. 2B, which shows the second indicator member 38 with half of the locked portion 38a and half of the unlocked portion 38b showing with the switch member 14 between the first and second positions.

In a preferred embodiment, the locked and unlocked portions on each of the indicator members are translucent. This allows light from the interior of the lavatory to show through to provide better indication to patrons outside of the lavatory. It will be appreciated by those of ordinary skill in the art that the indicator slots 42 in the first and second seat members 28 and 30 are aligned or at least partially aligned with the exterior and interior indicator windows 48 and 52. Furthermore, when the switch member 14 is in the first position the unlocked indicator window 32b of the rotating member 32 is aligned or at least partially aligned with the unlocked portion 34b of the first indicator member 34, the unlocked portion 38b of the second indicator member 38, the exterior indicator window 48 and the interior indicator window 52 to define an unlocked path through which light can pass to indicate that the door is unlocked. When the switch member 14 is in the second position the locked indicator window 32a of the rotating member 32 is aligned or at least partially aligned with the locked portion 34a of the first indicator member 34, the locked portion 38a of the second indicator member 38, the exterior indicator window 48 and the interior indicator window 52 to define a locked path through which light can pass to indicate that the door is locked.

In a preferred embodiment, the assembly 10 includes an overcenter assist spring 54 that helps move the switch member 14 and locking bolt 16 between the first (unlocked position) and the second (locked position) and vice versa. The assist spring 54 can be, for example, a compression coil spring. The first end of the assist spring 54 is connected to a non-moving piece, such as the housing 12 and the opposite second end is operatively connected to one of the gears 20 in the gear train. In a preferred embodiment, the first end of the assist spring 54 is connected to a sleeve bearing 56 that is received on a protrusion 58 on the front housing half 12a and the second end is connected to the fourth gear 20d (the gear that meshes with the rack or linear gear).

Figure 4A:
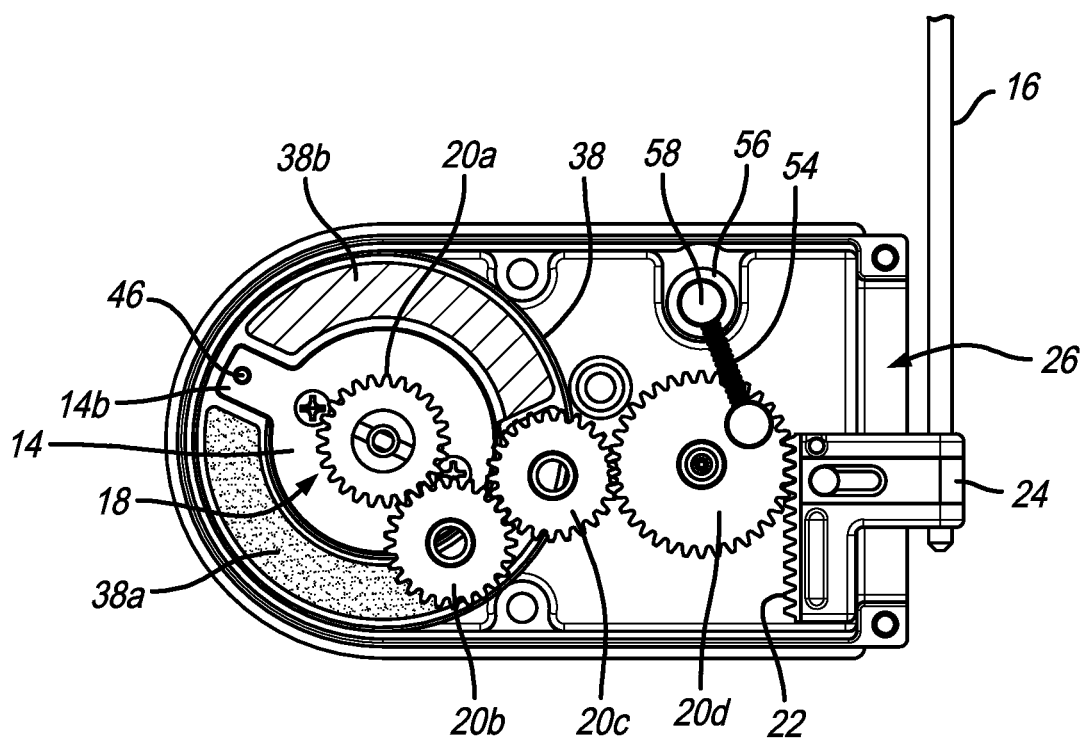
FIG. 4A is an elevational view of the interior of the housing of the door latch assembly of FIG. 1 showing the locking bolt in the unlocked position.
Figure 4B:
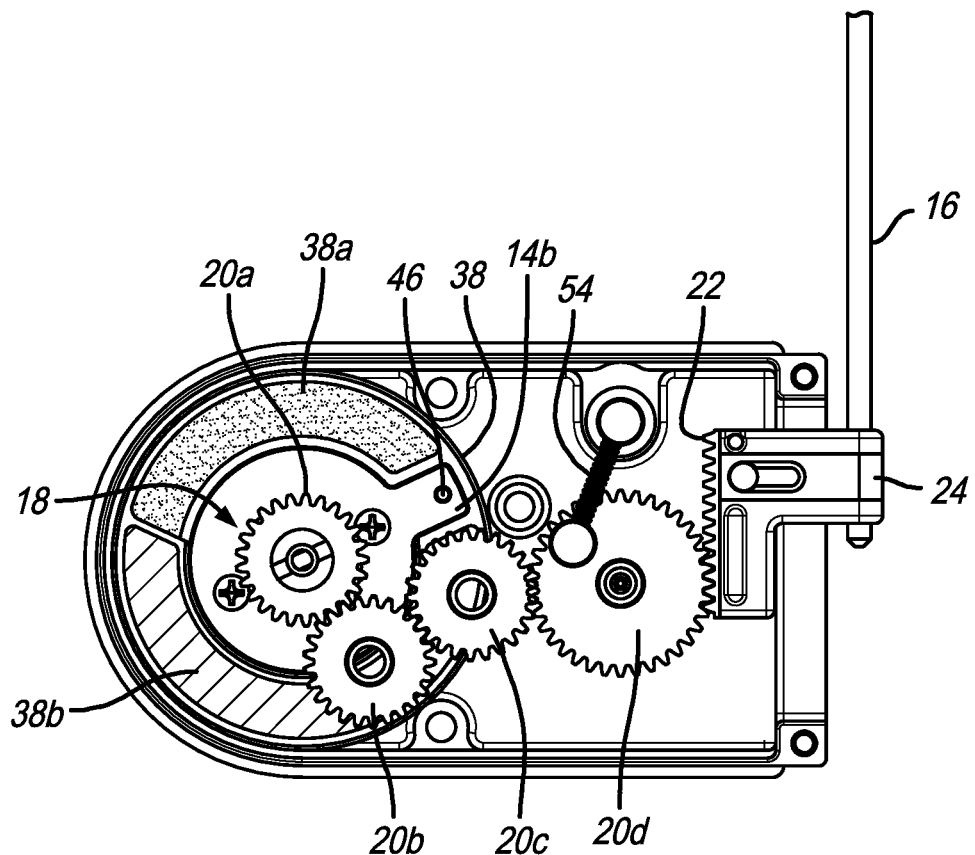
FIG. 4B is an elevational view of the interior of the housing of the door latch assembly of FIG. 1 showing the locking bolt in the locked position.

FIG. 4A shows the assist spring 54 in the first (unlocked position) and FIG. 4B shows the assist spring 54 in the second (locked position). In these positions the assist spring 54 is preferably not in tension or compression. As shown in FIGS. 4A-4B, the assist spring moves from one side of center of the fourth gear 20*d* to the other as the switch member 14 moves between the first and second positions. In use, as the switch member 14 is rotated, the assist spring 54 is compressed as the second end rotates through the top center of the rotation of the fourth gear 20*d*. Once the second end passes the top center of rotation of the fourth gear 20*d* it will decompress or expand and help move the gear 20*d*, and, as a result, the switch member 14 and ultimately the locking bolt 16, to the first (unlocked) or second (locked) position (depending on which way the switch member is being rotated).

Figure 5:
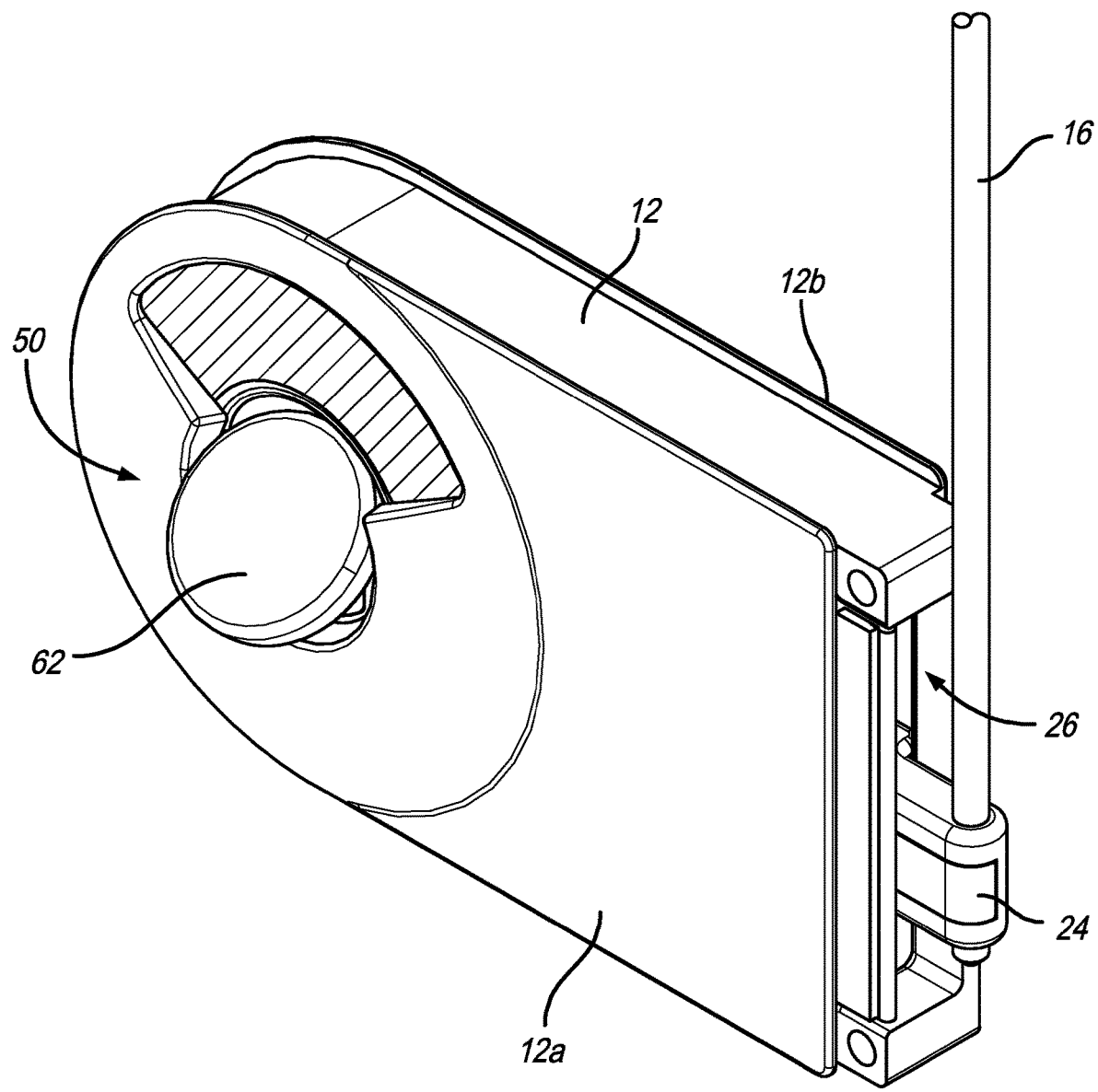
FIG. 5 is a perspective view of the door latch assembly of FIG. 1 showing the override finger lid between the stowed and deployed positions.
Figure 5A:
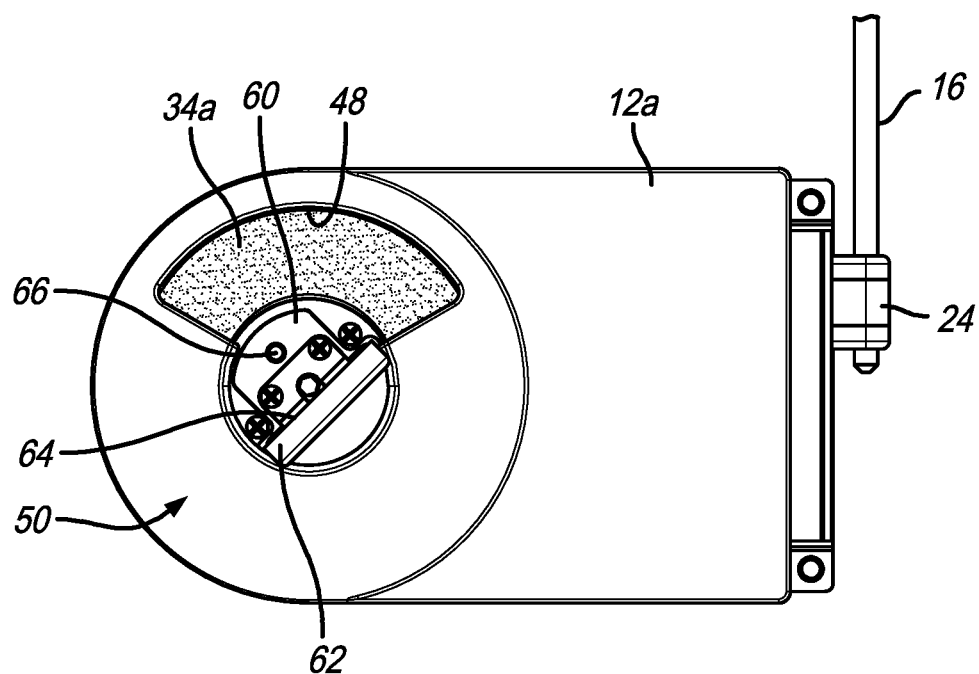
FIG. 5A is a front elevational view of the door latch assembly of FIG. 1 showing the override finger lid in the deployed position and in the first (locked) position.
Figure 5B:
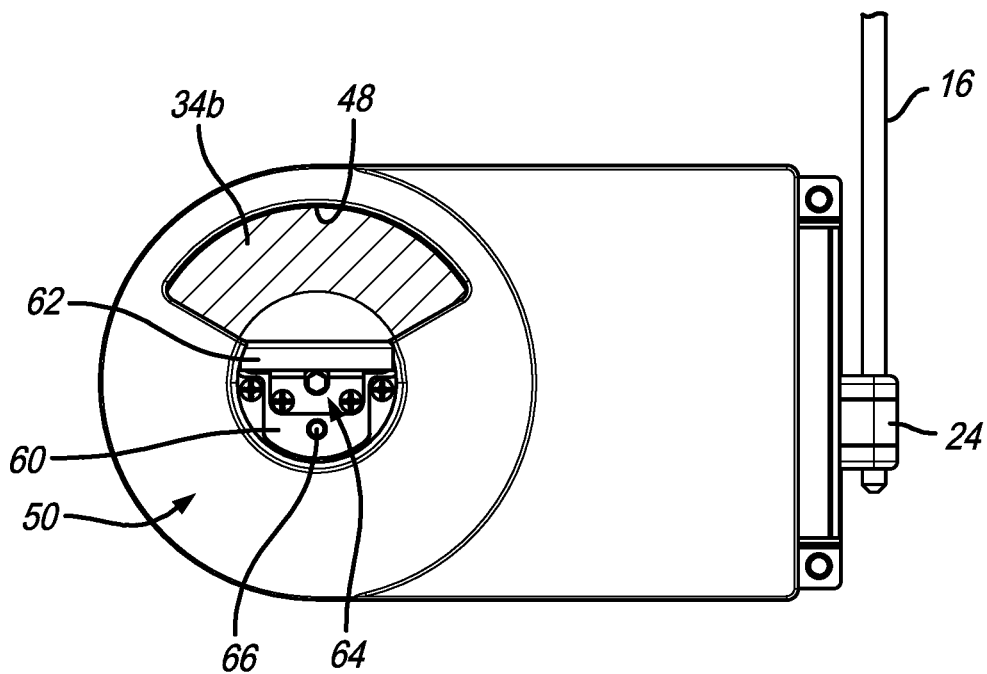
FIG. 5B is a front elevational view of the door latch assembly of FIG. 1 showing the override finger lid in the deployed position and in the second (unlocked) position.

As shown in FIGS. 5-5B, in a preferred embodiment, the present invention includes an override assembly 50 that can used by the crew to unlock the door in emergencies, e.g., when someone is passed out in the lavatory. The override assembly 50 includes a main body portion 60 that is connected to the rotating member 32, and a finger lid 62 that is hingedly connected to the main body portion 60. The end of the finger lid 62 opposite the hinge 64 is secured to the main body portion to that a crew member or other person has to use their finger or a tool to pry the finger lid 62 away from the main body portion 60 and move it from the stowed position (see FIG. 2A) to the deployed position (see FIGS. 5A-5B). Because the override assembly 50 is operatively connected to the rotating member 32, after the finger lid 62 has been moved to the deployed position, the override assembly can be rotated from the second position (locked position) to the first position (unlocked position) to unlock the door. Rotating the deployed finger lid 62 from the exterior of the lavatory causes the same actions as rotating the switch member 14 from the interior of the lavatory. The non-hinge end of the finger lid 62 can be secured to the main body portion 60 by any method. For example, it can be a friction fit, a snap fit, velcro, adhesive, etc. In a preferred embodiment, magnets 66 (one on the finger lid 62 and the other on the main body portion 60) are used.

Figure 6:
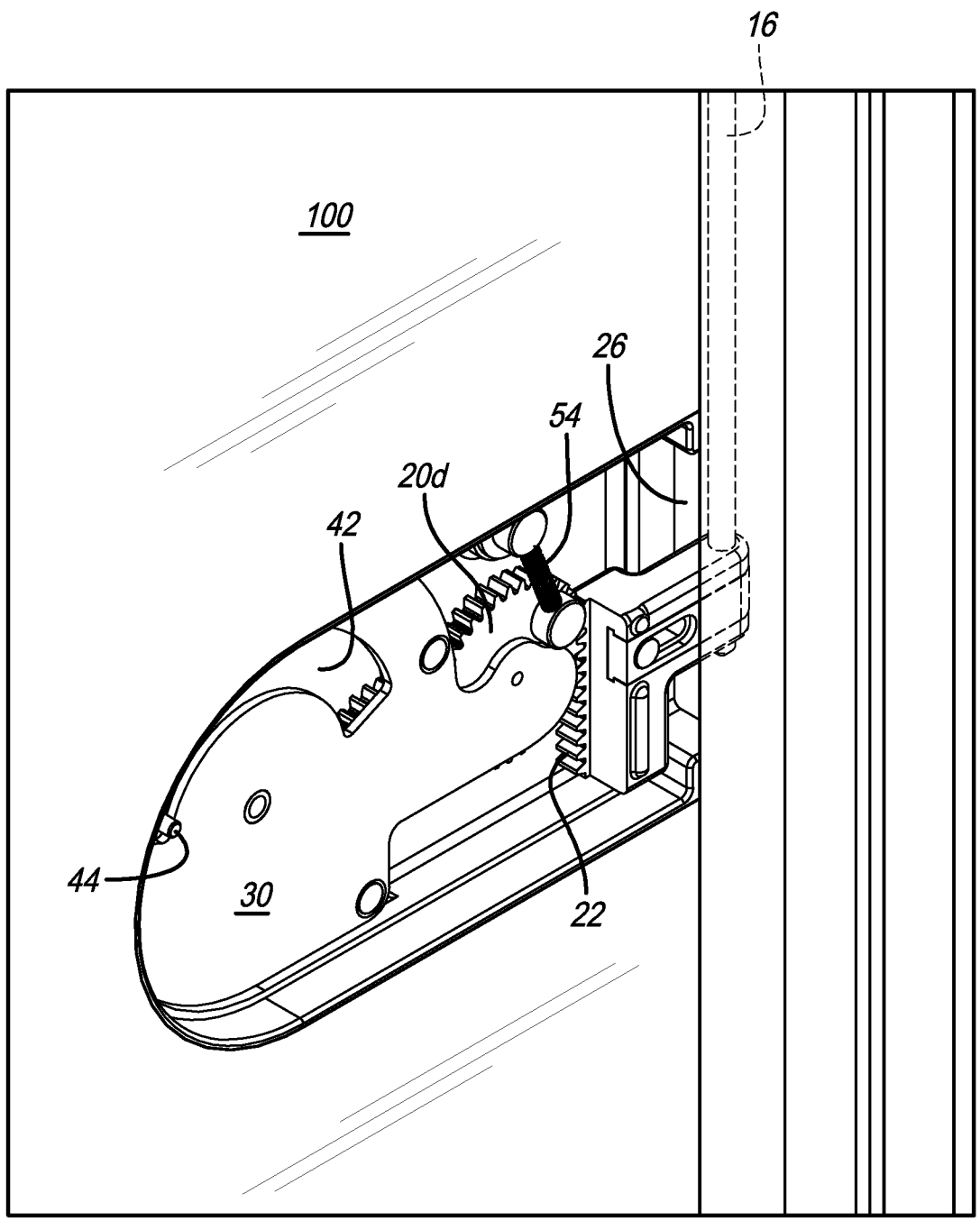
FIG. 6 is a perspective view of the door latch assembly of FIG. 1 installed in a bi-fold door with the front housing cover removed.
Figure 7:
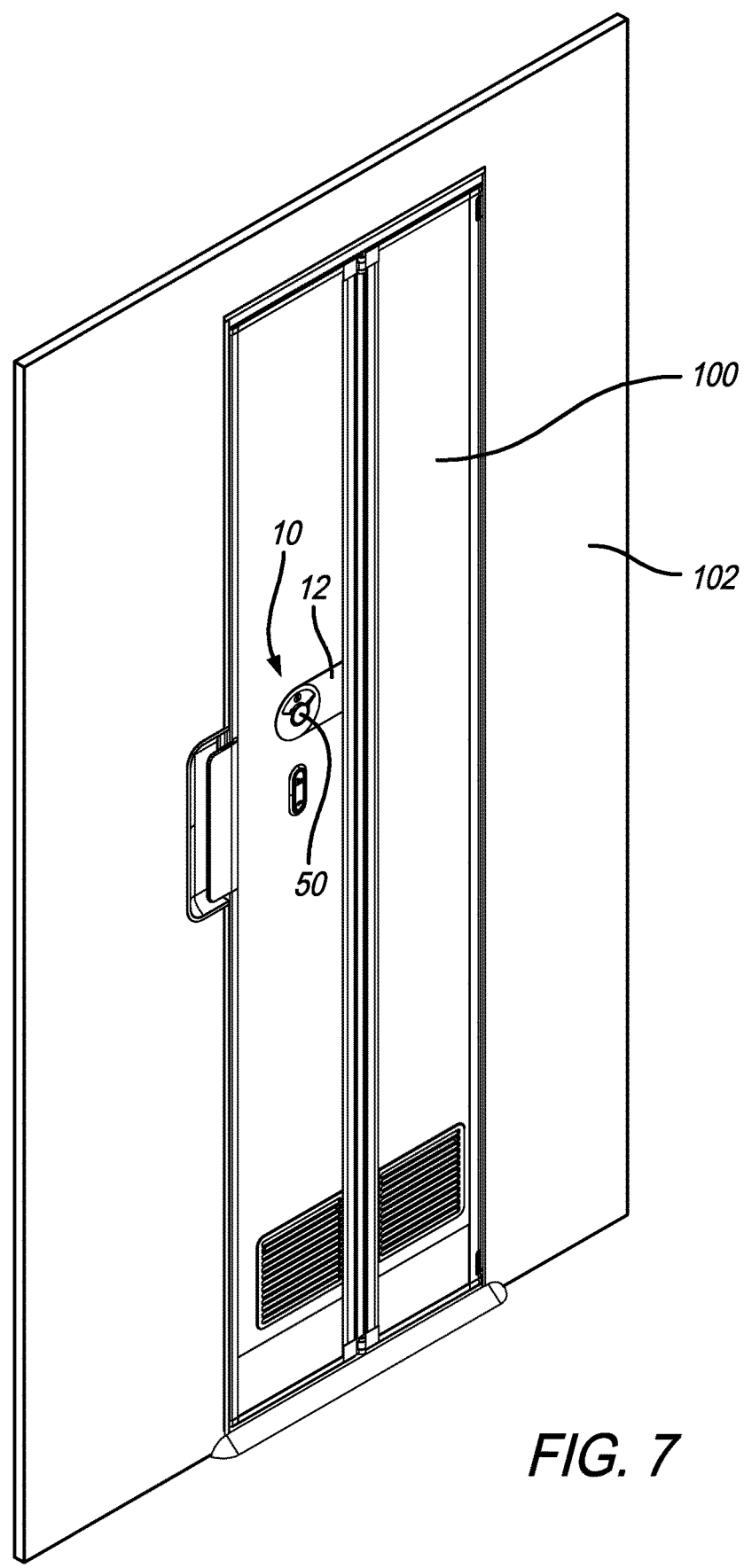
FIG. 7 is a perspective view of a bi-fold door with the door latch assembly of FIG. 1 installed therein.

FIG. 6 shows the door latch assembly 10 (with the front housing portion 12*a* and a number of other components removed) installed in a bi-fold door 100. As shown, the latching bolt 16 extends upwardly through a tunnel defined in the hinge member between the panels of the door. FIG. 7 shows the door latch assembly 10 installed in the bi-fold door 100 and secured in the wall of a lavatory 102.

Figure 8A:
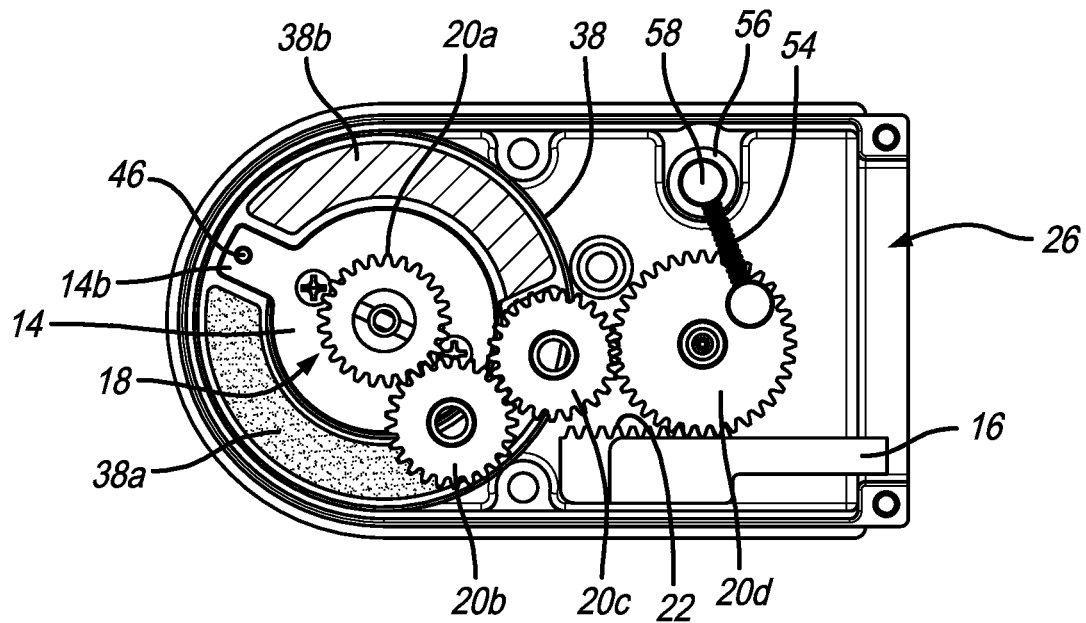
FIG. 8A is an elevational view of the interior of the housing of another door latch assembly and showing the locking bolt in the unlocked position.
Figure 8B:
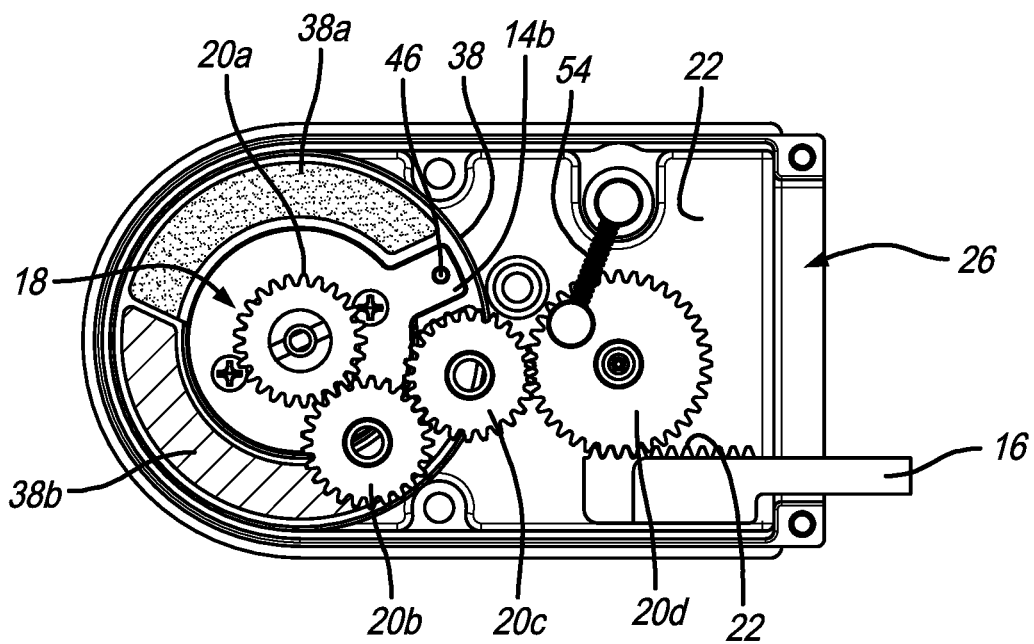
FIG. 8B is an elevational view of the interior of the housing of the door latch assembly of FIG. 8A showing the locking bolt in the locked position.

FIGS. 8A-8B show another embodiment of a door latch assembly 66 that can be used with a blade door. The assembly 66 is virtually identical to assembly 10 described above. However, the arm member and the vertically extending latching bolt are omitted. These components are replaced by a horizontally extending latching bolt 16 that is unitary with the rack or linear gear 22. Also, the rack gear 22 is positioned below (or above) the fourth gear 20*d* so that it moves horizontally instead of vertically. The latching bolt 16 extends through slot 26 and outside of the housing 12. Therefore, movement of the switch member 14 from the first (unlocked position) to the second (locked position) moves the latching bolt 16 from inside the housing 12 (the unlocked position) to the outside of the housing 12 (the locked position) so that it can mate with an opening in the door jamb to lock the door.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A door latch assembly comprising:
a housing that includes a housing interior,
a switch member operatively associated with the housing that is rotatable between a first position and a second position,
a locking bolt that is movable linearly between an unlocked position and a locked position,
a gear train operatively connected between the switch member and the locking bolt,
wherein rotational motion of the switch member is converted to linear motion of the locking bolt, such that rotation of the switch member from the first position to the second position moves the locking bolt from the unlocked position to the locked position, and
an override assembly that includes a main body portion and a finger lid hingedly connected to the main body portion, wherein the finger lid is pivotable between a stowed position and a deployed position, wherein rotational motion of the finger lid is converted to linear motion of the locking bolt by the gear train, such that rotation of the finger lid from a first position to a second position moves the locking bolt from the unlocked position to the locked position.

2. The door latch assembly of claim 1 wherein the gear train includes at least a first gear meshed with a rack gear.

3. The door latch assembly of claim 2 further comprising an overcenter assist spring having an end that rotates with the first gear, wherein the assist spring is configured to compress and then expand as the switch member rotates from the first position to the second position.

4. The door latch assembly of claim 1 wherein the finger lid is secured in the stowed position by a magnet.

5. The door latch assembly of claim 1 wherein rotation of the finger lid from the first position to the second position rotates the switch member from the first position to the second position.

6. The door latch assembly of claim 1 wherein rotation of the switch member from the first position to the second position rotates the finger lid from the first position to the second position.

7. The door latch assembly of claim 1 wherein the locking bolt is movable vertically between the unlocked position and the locked position.

8. A door latch assembly comprising:
a housing that includes a housing interior and an interior indicator window,
a switch member operatively associated with the housing that is rotatable between a first position and a second position,
a locking bolt that is movable linearly between an unlocked position and a locked position,
a gear train operatively connected between the switch member and the locking bolt, wherein rotational motion of the switch member is converted to linear motion of the locking bolt, such that rotation of the switch member from the first position to the second position moves the locking bolt from the unlocked position to the locked position,
at least a first indicator member that is rotatable with the switch member between the first position and the second position, wherein the first indicator member includes a locked portion and an unlocked portion, wherein the housing includes an exterior indicator window, wherein when the switch member is in the locked position the locked portion of the first indicator member is visible through the exterior indicator window, and wherein when the switch member is in the unlocked position the unlocked portion of the first indicator member is visible through the exterior indicator window, wherein when the switch member is in the locked position the locked portion of the indicator member is visible through the interior indicator window, and wherein when the switch member is in the unlocked position the unlocked portion of the indicator member is visible through the interior indicator window,
a rotating member that is rotatable with the switch member between the first position and the second position, wherein the rotating member includes an unlocked indicator window and a locked indicator window, wherein the unlocked indicator window is at least partially aligned with the interior indicator window and the exterior indicator window when the switch member is in the first position, and wherein the locked indicator window is at least partially aligned with the interior indicator window and the exterior indicator window when the switch member is in the second position.

9. The door latch assembly of claim 8 further comprising a connecting rod that extends from the switch member to the rotating member, and wherein the connecting rod extends through the second indicator member.

* * * * *